United States Patent [19]
Harrogate et al.

[11] Patent Number: 5,407,319
[45] Date of Patent: Apr. 18, 1995

[54] SEALING STRUCTURES FOR GAS TURBINE ENGINES

[75] Inventors: Ian W. R. Harrogate, Derby; David H. Taylor, Warwickshire; Arthur B. Griffin, Leicestershire; David W. Tuson, Coventry, all of England

[73] Assignee: Rolls-Royce plc, London, England

[21] Appl. No.: 207,626

[22] Filed: Mar. 9, 1994

[30] Foreign Application Priority Data

Mar. 11, 1993 [GB] United Kingdom ............... 9305012

[51] Int. Cl.⁶ .................................................. F01D 5/18
[52] U.S. Cl. ............................................ 415/115; 415/116
[58] Field of Search ........................... 415/115, 116, 117

[56] References Cited

U.S. PATENT DOCUMENTS

| | | | |
|---|---|---|---|
| 3,825,365 | 7/1974 | Peng | 415/116 |
| 4,314,793 | 2/1982 | DeTolla et al. | |
| 4,337,016 | 6/1982 | Chaplin | 415/116 |
| 4,635,332 | 1/1987 | Cederwall et al. | 415/115 |
| 4,725,199 | 2/1988 | Johnson | 415/209.3 |
| 4,804,310 | 2/1989 | Fuller et al. | 415/116 |
| 4,821,522 | 4/1989 | Matthews et al. | |
| 4,889,469 | 12/1989 | Wilkinson | |
| 5,169,287 | 12/1992 | Proctor et al. | 415/116 |
| 5,178,514 | 1/1993 | Damiral | 415/115 |

FOREIGN PATENT DOCUMENTS

| | | |
|---|---|---|
| 0178242 | 4/1986 | European Pat. Off. |
| 1193587 | 3/1970 | United Kingdom |
| 1225445 | 6/1971 | United Kingdom |
| 1488481 | 10/1977 | United Kingdom |
| 2050524 | 7/1981 | United Kingdom |
| 2210415 | 6/1989 | United Kingdom |

*Primary Examiner*—John T. Kwon
*Attorney, Agent, or Firm*—Cushman, Darby & Cushman

[57] ABSTRACT

A cooling and sealing arrangement in a gas turbine engine comprises a seal assembly (42,30) extending between nozzle guide vanes (20) and combustion chamber discharge nozzles (22). The nozzle guide vanes (20) have platforms (34,36) having extensions (34A,36A) which in one embodiment overlap the downstream ends of the discharge nozzles (22). Cooling air is supplied to the upstream edge portions of the platforms through holes (26,28C) in flanges (24,28) on the discharge nozzles (22). The seal assembly (42,30) defines a chamber (58,70) adjacent the platform extensions which is supplied with cooling air through metering holes (56,68) in the seal assembly. Cooling air exits the chamber (58,70) through holes (34B,36B) in the platform extensions to film cool them.

12 Claims, 2 Drawing Sheets

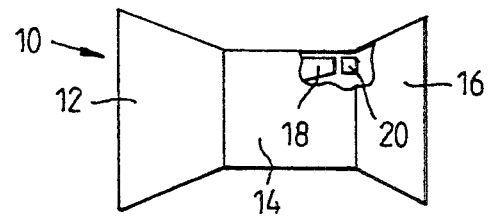
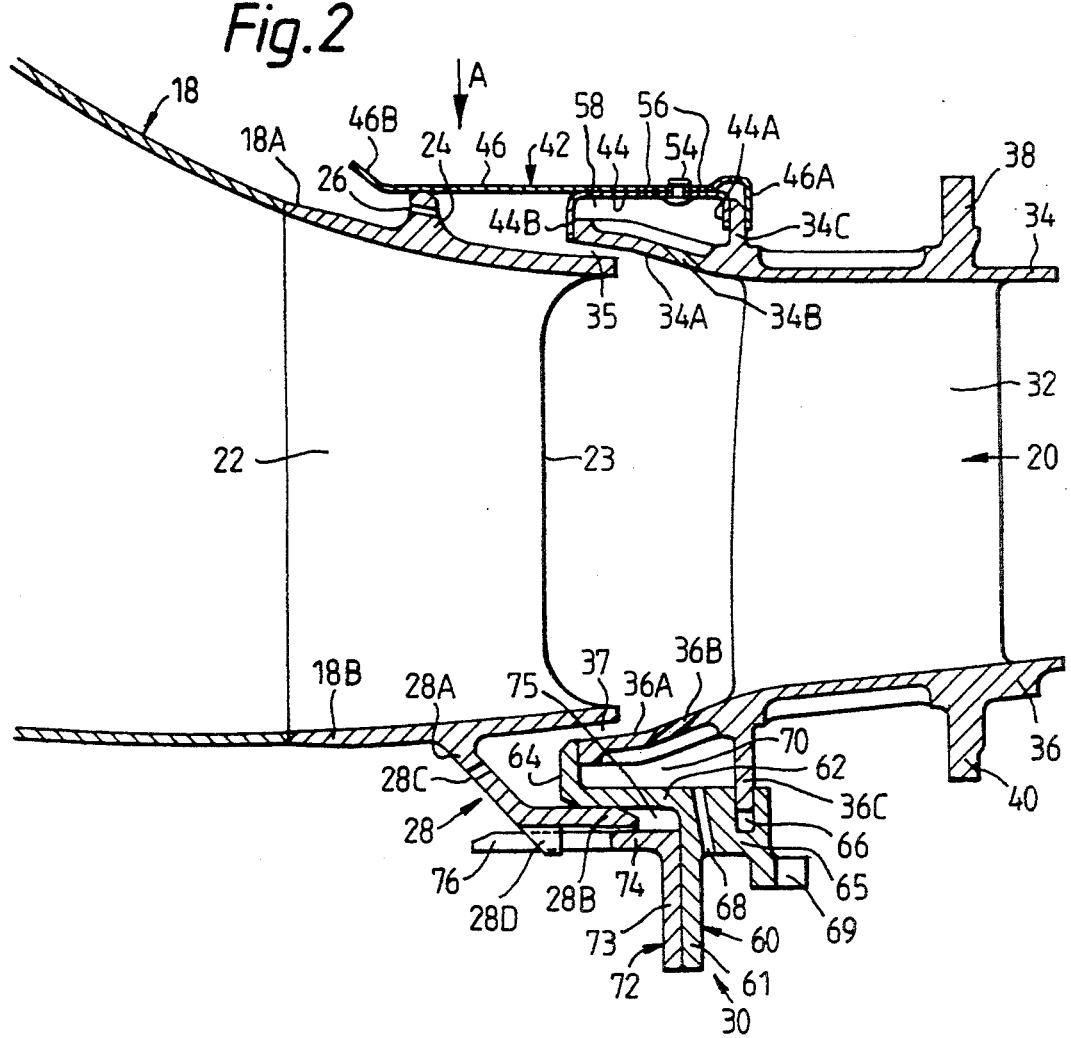

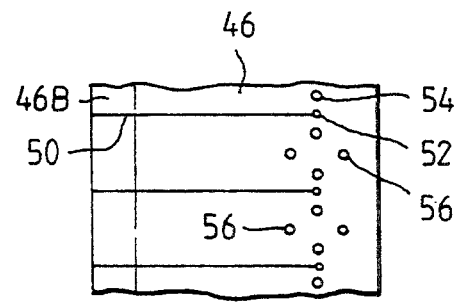
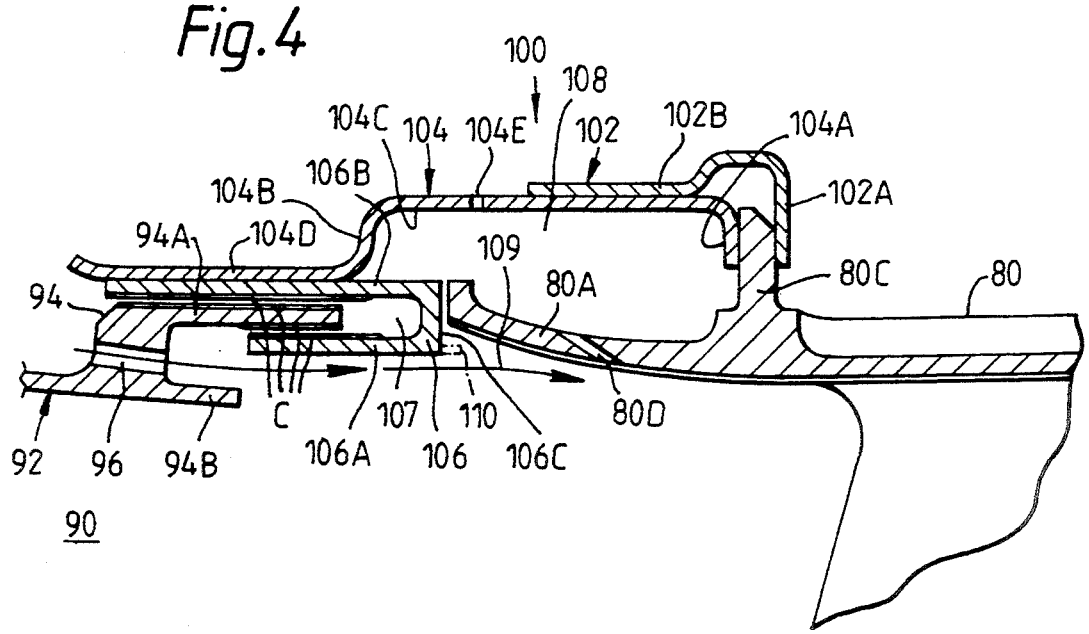

SEALING STRUCTURES FOR GAS TURBINE ENGINES

The present invention relates to axial flow gas turbine engines, in particular to sealing and cooling air supply structures for use between combustion chamber discharge nozzles and nozzle guide vanes downstream of such discharge nozzles.

A conventional present day axial flow gas turbine engine normally comprises, in axial flow sequence, a compressor section, a combustor (which may be radially disposed) in which compressed air from the high pressure compressor is mixed with fuel and burnt, and a turbine section driven by the products of combustion. In the case of an aeroengine (excluding turboshaft aeroengines), all the power developed by the turbine section is used to drive the compressor section, which can include a fan propulsor. In the case of a turboshaft engine, or an engine adapted for electrical power generation or marine propulsion, the turbine section has an upstream part which is used to drive the compressor section, and a downstream part comprising a power turbine on a power offtake shaft which rotates independently of the rest of the turbine section.

Note that in the present specification, the terms "upstream" and "downstream" refer to the direction of compressed air and combustion gas flows through the axial flow compressors and turbines of axial flow gas turbine engines. Hence, for a component associated with a main gas passage of such a turbine or compressor, the upstream direction is towards the front of the engine and the downstream direction is towards its rear.

The products of combustion pass from the combustor through discharge nozzles to the first stage of the turbine through an array of nozzle guide vanes. These nozzle guide vanes are supported and located both axially and radially in a known manner to cope with the dynamic and thermal loads occurring during engine operation.

The downstream end of the combustor must also be located and supported in such a way that it can cope with the dynamic and thermal loads which occur during engine operation. Furthermore, the support and location of the nozzle guide vanes and the downstream portion of the combustor should be such that loads applied to nozzle guide vanes do not impose loads upon the downstream portion of the combustor and vice versa.

One object of the present invention is to provide effective means for sealing the flow path of the products of combustion as they pass from the discharge nozzles to the nozzle guide vanes.

Another object is to provide means for cooling the inner and outer platforms of the nozzle guide vanes.

A further object is to provide a cooling and sealing arrangement between the nozzle guide vanes and the discharge nozzles of the combustor.

In particular the present invention seeks to provide a cooling and sealing arrangement located between the outer platform of the nozzle guide vanes and a radially outer portion of the downstream end of the discharge nozzles of the combustor.

The present invention further seeks to provide a means of supporting and locating the downstream portion of the combustor relative to the nozzle guide vane array.

Accordingly, the present invention provides an axial flow gas turbine engine having combustion discharge nozzle means, an array of nozzle guide vanes located downstream of the discharge nozzle means, and a seal assembly for sealing between the discharge nozzle means and the nozzle guide vanes, the nozzle guide vanes having platforms defining gas passage means for combustion gases from the discharge nozzle means, a downstream portion of the seal assembly being sealingly engaged with the platforms of the nozzle guide vanes and an upstream portion of the seal assembly being sealingly engaged with the discharge nozzle means, the platforms of the nozzle guide vanes having upstream portions extending towards the discharge nozzle means, the seal assembly forming a chamber in combination with the upstream portions of the platforms, the seal assembly having cooling air holes therein for metering cooling air into the chamber, and the platforms having cooling air holes therein connecting the chamber to the gas passage means for producing a film of cooling air on the platforms to protect them from the effects of combustion products in the gas passage means.

Conveniently, the seal assembly has flange means cooperating with upstream edges of the nozzle guide vane platforms to define an upstream side of the chamber.

Preferably, the seal assembly comprises inner and outer members secured together, the inner member having flange means cooperating with the upstream edges of the nozzle guide vane platforms to define an upstream side of the chamber and the outer member having an upstream extending portion which sealingly engages flange means on the discharge nozzle means.

Preferably, the flange means on the discharge nozzle means has cooling air holes provided therein for supply of film cooling air to upstream edge portions of the nozzle guide vane platforms.

The platforms may either be outer platforms of the nozzle guide vanes, in which case the seal assembly is a light weight sheet metal construction, or inner platforms of the nozzle guide vanes, in which case the seal assembly comprises rigid structure for location and support of the nozzle guide vanes and discharge nozzles within the engine. In the former case, the seal assembly may comprise an inner member and an outer member secured together, the inner member having an inwardly directed flange at a downstream end thereof, the outer member having an inwardly directed flange at a downstream end and a flexible lip at an upstream end, the inwardly directed flanges at the downstream ends of the inner and outer members being adapted to clip on to flange means on the outside of the nozzle guide vane platforms for positive location of the seal assembly relative to the nozzle guide vanes and the flexible lip on the outer member slidingly contacting flange means on the discharge nozzle means. Preferably, the flexible lip is formed with a plurality of axially extending slots. In the latter case, the discharge nozzles are preferably cross-key located in the seal assembly.

Upstream end portions of the nozzle guide vane platforms may axially overlap the downstream end of the discharge nozzle means such that a gap is defined between the platforms and the discharge nozzle means for flow of cooling air in a downstream direction over the upstream end portion of the nozzle guide vane platforms and into the gas passage means.

In an alternative embodiment, for use with the outer platforms of the nozzle guide vanes, the seal assembly comprises an inner member and an outer member secured together, the inner member having an inwardly directed flange at a downstream end thereof and the outer member having an inwardly directed flange at a downstream end and two mutually parallel axially extending portions at an upstream end, which axially extending portions define a slot, the inwardly directed flanges at the downstream ends of the inner and outer members being adapted to clip on to flange means on the outside of the nozzle guide vane platforms for positive location of the seal assembly relative to the nozzle guide vanes, the discharge nozzle means having axially extending flange means slidingly located in the slot.

The present invention will now be more particularly described with reference to the accompanying drawings in which:

FIG. 1 shows diagrammatically an axial flow gas turbine engine;

FIG. 2 shows a portion of a gas turbine engine to a larger scale, incorporating one embodiment of the present invention;

FIG. 3 shows a partially developed view on arrow A in FIG. 2; and

FIG. 4 shows an alternative embodiment of the invention.

Referring to FIG. 1, a gas turbine engine 10 comprises a compressor 12, a combustor 14 and a turbine 16. The combustor 14 is of the can-annular type; that is, there are a number of combustion chambers each having separate but circumferentially closely adjacent or contiguous discharge nozzles, the combustion chambers being located in an annular casing. In FIG. 1 the annular casing is not shown but each combustion chamber is indicated at 18 and an array of nozzle guide vanes 20 is located between the downstream end of the combustion chambers 18 and the first stage of the turbine 16.

Although the combustion chamber 18 is shown as axially disposed, some industrial and power generating engines have combustion chambers which are radially disposed, at least at their upstream ends, and the embodiment of FIG. 2 is particularly applicable to these.

Referring more particularly to FIG. 2, this shows the axially disposed downstream portion 18A of a combustion chamber 18 and the nozzle guide vanes 20 in more detail. Each combustion chamber 18 has a discharge nozzle 22 and the combination of the discharge nozzles 22 define a generally annular outlet divided by radially extending side walls 23 of each discharge nozzle 22. Each discharge nozzle has on its radially outer surface a circumferentially and radially extending flange 24, termed a "rail". Flanges or rails 24 on the individual discharge nozzles 22 together form a circumferential ring. Each rail 24 is provided with a plurality of circumferentially spaced apart cooling air holes 26.

The radially inner wall 18B of each discharge nozzle 22 is provided with a circumferentially and inwardly extending cranked flange 28 having an outer part 28A inclined to the axial and radial directions and an axially extending inner part 28B. Flanges 28 of adjacent discharge nozzles abut each other so that the outer parts 28A of the flanges 28 collectively form a frustum and the inner parts 28B collectively form a cylinder. Part 28A is provided with a plurality of circumferentially spaced apart cooling air holes 28C and part 28B is provided with a row of circumferentially spaced apart radially inwardly extending projections or teeth 28D. The flange part 28B and the projections 28D engage with a support structure 30, which will be described in more detail below.

Each nozzle guide vane 20 comprises an aerofoil portion 32, which is cast integrally with an outer platform 34 and an inner platform 36. Platforms 34 and 36 are provided with dogs 38 and 40 respectively, which are held in a conventional manner in static structure (not shown) of the engine, in order to locate the vanes and to support them against loads imposed during engine operation.

The outer and inner platforms have forwardly projecting extensions 34A and 36A, respectively, which extend towards the outer and inner walls 18A,18B, respectively, of the discharge nozzles 22. The upstream ends of the platform extensions 34A,36A overlap and embrace the downstream ends of the discharge nozzles' outer and inner walls such that respective gaps 35,37 remain for a flow of film cooling air onto the platforms past their upstream edges. Both of the extensions 34A and 36A are additionally provided with holes 34B and 36B respectively for renewing and adding to the flow of film cooling air over the platforms.

A sheet metal seal assembly 42 is arranged to provide a seal between the outer platforms 34 of the nozzle guide vanes 20 and the adjacent parts of the discharge nozzles 22 of the combustion chambers 18. This seal assembly 42 comprises inner and outer ring members 44 and 46, which extend axially in contact with each other and are secured together by circumferentially spaced rivets 54. Inner ring 44 has two inwardly directed flanges 44A and 44B at its axially opposed ends, whereas outer ring 46 is provided with an inwardly directed flange 46A at its rear end and an outwardly turned flexible lip 46B at its front end.

The flanges 44A and 46A of the rings 44 and 46 are axially spaced by an amount sufficient to allow the seal assembly to clip over a short radially projecting flange or rail 34C on the outer platform 34 of each nozzle guide vane 20. Flanges 44A and 46A are sufficiently engaged with the rails 34C that the forward end of the outer ring 46 resiliently engages the rails 24 on the discharge nozzles 22 and the flange 44B of inner ring 44 slides over the upstream end of the extended platform portion 34A. The angled lip 46B provides a lead in to aid insertion of the discharge nozzles 22 during assembly of the engine.

As the means of support 30 for the discharge nozzles 22 is at an inner location, the seal assembly 42 only needs to provide a seal and a controlled cooling air flow. In order to avoid opposing thermal loading across the radial height of the discharge nozzle between the inner support and the outer seal assembly, the outer seal assembly 42 is as flexible as possible.

Referring particularly to FIG. 3, the outer ring 46 is provided with a plurality of spaced apart very narrow slots 50 which terminate in small holes 52 drilled only through ring 46. Slots 50 render the upstream or forward end of ring 46 sufficiently flexible to allow assembly of the engine and to allow for relative radial movement between the discharge nozzles 22 and the nozzle guide vanes 20 during engine operation. In the present instance, holes 52 and slots 50 are shown as provided between every alternate pair of rivets 54 to obtain the desired flexibility in a high grade proprietary sheet alloy, such as Haynes 25 (Trade Mark), with a thickness of about 1 mm. Inner sheet metal ring 44 can conveniently be made of the same material. The small holes 52 are stress relieving features to prevent overstressing of the sheet material at the rear ends of the slots as it flexes during assembly and operation of the engine.

Cooling air inlet holes 56, drilled through both rings 44 and 46, are provided to allow air to enter the outer annular space 58 created between the seal assembly 42 and the outer platform extension 34A of the nozzle guide vanes 20. Air entering through holes 56 feeds the outflow of air through the circumferential row of cooling holes 34B in platform extensions 34A. Holes 34B are angled rearwardly and are sufficiently closely spaced to enable the air flowing out of them to spread out and perform a film cooling function, as known per se, on the inner surface of the nozzle guide vane platform 34.

Also, cooling air can enter through the drillings 26 in the rails 24. This supplements the air flow through the slots 50 and leakage flow between ring 46 and rail 24 to cool the outsides of the discharge nozzles 22 and ensure a flow of film cooling air through the gap 35 between the outsides of the discharge nozzles and the inner surfaces of the upstream ends of the nozzle guide vane outer platform extensions 34A.

It will be appreciated that the seal assembly 42 acts only as a seal between the discharge nozzle 22 and the nozzle guide vanes 20 and does not provide any mechanical support for these components. It also helps to meter cooling air supplies to the outer surfaces of the discharge nozzles 22 and the outer platforms 34 of the nozzle guide vanes 20.

The discharge nozzle and nozzle guide vane support assembly 30 comprises outer and inner ring members 60 and 72 which both have radially inner radially co-extending portions 61,73 which are secured together in contact with each other along plane contact faces by circumferentially spaced bolts (not shown).

The outer part of ring member 60 comprises a forwardly extending flange 62 having a radially outwardly turned flange or lip 64, the rear face of which engages, or is closely adjacent to, the forward edge of the vane's inner platform extension 36A. This defines a chamber 70 for the supply of cooling air to the row of rearwardly inclined holes 36B in the inner platform extension 36A, which fulfil a similar purpose to the holes 34B in the outer platform. The outer part of ring member 60 also comprises a rearwardly extending portion 65 having a circumferentially extending slot 66 in which front lugs or flanges 36C of the nozzle guide vane inner platforms 36 are located. Holes 68 are drilled through the radially outer part of ring member 60 so that the chamber 70 is supplied with cooling air. The other feature of ring member 60 is the circumferentially spaced array of teeth 69 provided at the rear of portion 65. These teeth 69 are provided, as known, to engage with neighbouring static structure (not shown) to provide cross-key location for the front of the nozzle guide vanes 20.

The inner ring member 72 has a forwardly extending flange 74, which in conjunction with the forwardly extending flange 62 of ring member 60 defines an annular slot or mouth 75 sized to receive the rearwardly extending inner part 28B of the cranked flange 28 supporting the discharge nozzle 22. To complete cross-key location of the discharge nozzles, flange 74 is formed with a plurality of circumferentially equi-spaced slots 76 in which are received corresponding teeth 28D projecting inwardly from the flange part 28B.

Assembly 30 is a simple two component arrangement which provides a controlled circumferential mouth 75 for supporting and locating the downstream end of the discharge nozzles and provides adequate sealing and control of cooling flows to the inner platforms of the nozzle guide vanes. This means of supporting the downstream ends of the combustion chambers 18 allows relative axial movement between the discharge nozzles 22 and the nozzle guide vanes 20, whilst reacting other dynamic and thermal loading occurring during engine operation. Also, in the event of engine surge, when the direction of forces generated by the air passing through the discharge nozzles is reversed, the arrangement will provide them with the necessary positive location.

The overall combination of the inner seal and support assembly 30 and the outer seal assembly 42 further provides a minimum of opposing thermal loads across the radial height of the discharge nozzle side walls 23 between the inner and outer supporting and sealing arrangements.

It should be noted that the part 28A of the flange 28 is provided with cooling air inlet openings 28C, supplemented by leakage flow through the slots 76 past the part 28B, so cooling the undersides of the discharge nozzles 22 and ensuring a flow of cooling air through the gap between the underside of the discharge nozzles and the upstream ends of the outer surfaces of the nozzle guide vane inner platform extensions 36A.

A matter of interest concerning the nozzle guide vane platform extensions 34A,36A is connected with reducing aerodynamic losses. The extension of the platforms to embrace and overlap the outlet from the discharge nozzles 22 reduces or eliminates the bow wave effect which would otherwise arise if the outlet from the discharge nozzles 22 was aligned with the inlet to the nozzle guide vanes 20 defined by the outer platform 34. The presence of a bow wave causes hot streaks on the platforms of the nozzle guide vanes due to impingement of the hot combustion gases on the surface. This is detrimental to component performance and life.

Turning now to FIG. 4, an alternative configuration is shown for the combination of a nozzle guide vane outer platform 80 and a flanged ring 94 at the downstream end of a combustor discharge nozzle outer wall 92, with a seal assembly 100 between them. It should be noted that in this embodiment of the invention the combustor is completely annular, as is its discharge nozzle 90, and the forward extension 80A of the outer platform 80 does not overlap the downstream end ring 94 of the discharge nozzle. However, the gap between these two components is bridged by the seal assembly 100 in a way that reduces the previously mentioned flow disturbances caused by the flow transition between the discharge nozzle and the guide vanes.

The seal assembly 100 again comprises outer and inner ring members 102 and 104 which are somewhat similar to rings 46 and 44 in FIG. 2, in that they are secured together by means of spot welds or rivets (not shown) and clipped over short radially projecting flanges or rails 80C on the outer surface of the nozzle guide vane outer platforms 80. The rings 102,104 each have an inwardly directed flange 102A,104A, respectively, which cooperate to define an annular space in which are fitted the rails 80C of the nozzle guide vanes.

The inner ring 104 is stepped at 104B, having a radially outer cylindrical portion 104C which is secured in contact with a cylindrical portion 102B of outer ring 102, and a radially inner cylindrical portion 104D. This portion 104D is secured by rivets or welds to a further and innermost ring 106 having two mutually parallel axially extending flange portions 106A and 106B which define an annular slot 107. The ring 94 at the downstream end of the discharge nozzle 90 is provided with an axially extending flange 94A, which locates in the annular slot 107, and a lip 94B, also extending in a downstream direction, but continuing the line of the outer wall 92 of the discharge nozzle 90. Clearances are left between the flanges 94A,106A and 106B to allow for a substantial proportion of the expected relative radial movements due to differential thermal expansion of the components during normal running of the engine. The remainder of the relative radial movements, i.e., those which are not allowed for by the clearances between the flanges 94A,106A and 106B, are absorbed by the inherent radial flexibility of the ring 104 of the seal assembly 100. However, the radial flexibility of the ring 104 is not as great as that of the ring 46 in FIG. 2, because although it may be made of a similar grade of material, with similar thickness, ring 104 is not provided with any axial slots like slots 50 in FIG. 2.

Note that surfaces of the flanges likely to come into contact with each other during relative expansion and contraction of the components are given anti-fretting coatings C, as known in the industry.

Under some operating conditions of the engine, radially outward movement of the seal ring member 106 relative to the upstream edges of the nozzle guide vane outer platforms 80 may become just sufficient to expose these upstream edges, so creating a small upstream facing step in the gas passage inner wall which would interfere with the smooth and even flow of cooling air 109 onto the inner surfaces of the upstream portions of the platforms. This could, for instance, be caused by excessive radial thermal expansion of the discharge nozzle end ring 94 relative to the nozzle guide vane outer platforms 80. If this is deemed to be a risk, the seal ring member 106 may be provided with a small detent feature 110 in the form of an annular lip (shown in dotted lines) which will prevent excessive radially outward movement of the rear face 106C of the ring member 106 relative to the upstream edges of the nozzle guide vane outer platforms. Plainly, this strategy may rely on some flexibility inherent in the downstream end 94 of the discharge nozzle to avoid damage to the components of the seal assembly 100 and the flange 94A.

To provide film cooling for the outer platforms, ring 94 has a circumferentially extending row of cooling air holes 96 situated to allow cooling air to flow between the outer flange 94A and the inner lip 94B of the ring 94, then over the inner flange 106A of the innermost ring 106 of the seal assembly 100, and then over the inner surface of the nozzle guide vane outer platform extension 80A.

To supply cooling air to the chamber 108 defined between the platform extension 80A and the seal assembly 100, inner ring 104 of the seal assembly 100 has a circumferentially extending row of cooling air inlet holes 104E. From chamber 108, the cooling air flows through a circumferentially extending row of angled holes 80D in the platform extension 80A to film cool its inner surface, thereby supplementing and renewing the cooling air film already produced by the flow through holes 96 in ring 94.

It will be seen from the above that, in conjunction with the flanges 94A(FIG. 4), 24 and 28(FIG. 2) on the discharge nozzles, the respective assemblies 100, 42 and 30 provide adequate sealing at the interfaces between the discharge nozzles and the nozzle guide vanes and control cooling air flows to the upstream extensions of the nozzle guide vane platforms. The embodiments of the invention also aim to facilitate an even distribution of cooling air flow into the main flow. Since nozzle guide vane outer platforms 80A do not overlap the downstream ends of the discharge nozzles, seal assembly 100 also provides a smooth transition for the flow of gases between the discharge nozzles 90 and the nozzle guide vane outer platforms 80, thereby reducing or preventing the creation of hot streaks on the nozzle guide vane platforms.

One of the advantages of both seal assemblies 42 and 100 is that no significant additional loads are imposed on the nozzle guide vanes because they allow relative thermal expansion between the inner support assembly, the discharge nozzles and the outer seal assembly itself without creating opposing thermal loads across these three components. Such additional loads could interfere with the freedom of individual nozzle guide vanes to tilt along the lengths of their existing chordal seals (such as flanges 36C, 38 and 40 in FIG. 2) in response to differential loads.

We claim:

1. An axial flow gas turbine engine having combustion discharge nozzle means, an array of nozzle guide vanes located downstream of the discharge nozzle means, and a seal assembly for sealing between the discharge nozzle means and the nozzle guide vanes, the nozzle guide vanes having platforms defining gas passage means for combustion gases from the discharge nozzle means, a downstream portion of the seal assembly being sealingly engaged with the platforms of the nozzle guide vanes and an upstream portion of the seal assembly being sealingly engaged with the discharge nozzle means, the platforms of the nozzle guide vanes having upstream portions extending towards the discharge nozzle means, the seal assembly forming a chamber in combination with the upstream portions of the platforms, the seal assembly having cooling air holes therein for metering cooling air into the chamber, and the platforms having cooling air holes therein connecting the chamber to the gas passage means for producing a film of cooling air on the platforms to protect them from the effects of combustion products in the gas passage means.

2. A gas turbine engine as claimed in claim 1 in which the seal assembly has flange means cooperating with upstream edges of the nozzle guide vane platforms to define an upstream side of the chamber.

3. A gas turbine engine as claimed in claim 1, in which the seal assembly comprises a first member and second member secured together, the first member having flange means cooperating with the upstream edges of the nozzle guide vane platforms to define an upstream side of the chamber and the second member having an upstream extending portion which sealingly engages flange means on the discharge nozzle means.

4. A gas turbine engine as claimed in claim 3, in which the flange means on the discharge nozzle means has cooling air holes provided therein for supply of film cooling air to upstream edge portions of the nozzle guide vane platforms.

5. A gas turbine engine as claimed in claim 4 in which the platforms are outer platforms of the nozzle guide vanes and the seal assembly is a light weight sheet metal construction.

6. A gas turbine engine as claimed in claim 5, in which the seal assembly comprises an inner member and an outer member secured together, the inner member having an inwardly directed flange at a downstream end thereof, the outer member having an inwardly directed flange at a downstream end and a flexible lip at an upstream end, the inwardly directed flanges at the downstream ends of the inner and outer members being adapted to fit over flange means on the outside of the nozzle guide vane platforms for positive location of the seal assembly relative to the nozzle guide vanes and the flexible lip on the outer member slidingly contacting flange means on the discharge nozzle means.

7. A gas turbine engine as claimed in claim 6, in which the flexible lip is formed with a plurality of axially extending slots.

8. A gas turbine engine as claimed in claim 7 in which upstream end portions of the nozzle guide vane platforms axially overlap the downstream end of the discharge nozzle means such that a gap is defined between the platforms and the discharge nozzle means for flow of cooling air in a downstream direction over the upstream end portion of the nozzle guide vane platforms and into the gas passage means.

9. A gas turbine engine as claimed in claim 5, in which the seal assembly comprises an outer member and an inner member secured together, the outer member having an inwardly directed flange at a downstream end thereof and the inner member having an inwardly directed flange at a downstream end and two mutually parallel axially extending portions at an upstream end, which axially extending portions define a slot, the inwardly directed flanges at the downstream ends of the inner and outer members being adapted to fit over flange means on the outside of the nozzle guide vane platforms for positive location of the seal assembly relative to the nozzle guide vanes, the discharge nozzle means having axially extending flange means slidingly located in the slot.

10. A gas turbine engine as claimed in claim 3, in which the platforms are inner platforms of the nozzle guide vanes and the seal assembly comprises rigid structure for location and support of the nozzle guide vanes within the engine.

11. A gas turbine engine as claimed in claim 6, in which the discharge nozzle means are cross-key located in the seal assembly.

12. A gas turbine engine as claimed in claim 10, in which the seal assembly comprises an outer member and an inner member secured together, the outer member having means defining a first slot at a downstream end thereof and the inner and outer members having mutually parallel axially extending portions at an upstream end, which axially extending portions define a second slot therebetween, the first slot being adapted to receive flange means on the inside of the nozzle guide vane platforms for sealing location of the nozzle guide vanes, the discharge nozzle means having axially extending flange means slidingly located in the second slot.

* * * * *